United States Patent
Saito

(10) Patent No.: US 9,678,328 B2
(45) Date of Patent: Jun. 13, 2017

(54) EYEPIECE LENS AND IMAGING APPARATUS

(71) Applicant: FUJIFILM Corporation, Tokyo (JP)

(72) Inventor: Hiroki Saito, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/726,615

(22) Filed: Jun. 1, 2015

(65) Prior Publication Data

US 2015/0362720 A1    Dec. 17, 2015

(30) Foreign Application Priority Data

Jun. 11, 2014  (JP) ................................. 2014-120240

(51) Int. Cl.
| | |
|---|---|
| *G02B 25/00* | (2006.01) |
| *G02B 23/24* | (2006.01) |
| *G02B 15/14* | (2006.01) |
| *G02B 9/34* | (2006.01) |

(52) U.S. Cl.
CPC ................... *G02B 25/001* (2013.01)

(58) Field of Classification Search
CPC .... G02B 25/001; G02B 15/173; G02B 13/00; G02B 3/00; G02B 13/16; G02B 21/02; G02B 9/34; G02B 13/04
USPC ....... 359/644, 687, 362, 643, 642, 650, 660, 359/715, 753, 774
See application file for complete search history.

(56) References Cited

U.S. PATENT DOCUMENTS

| | | | |
|---|---|---|---|
| 2,217,281 A | 10/1940 | Albert | |
| 9,454,062 B2 | 9/2016 | Matsuo | |
| 2012/0224271 A1* | 9/2012 | Matsuo | ................ G02B 25/001 359/716 |
| 2015/0205091 A1 | 7/2015 | Matsuo et al. | |
| 2015/0212289 A1* | 7/2015 | Matsuo | ................ G02B 25/001 348/360 |

FOREIGN PATENT DOCUMENTS

| | | |
|---|---|---|
| JP | 2002-048985 | 2/2002 |
| JP | 2006-106491 | 4/2006 |
| JP | 2007-264179 | 10/2007 |
| JP | 2012068302 | 4/2012 |
| JP | 2012194541 | 10/2012 |
| JP | 2013088632 | 5/2013 |
| JP | 2014074816 | 4/2014 |

OTHER PUBLICATIONS

"Office Action of Japan Counterpart Application" with English translation thereof, issued on Apr. 18, 2017, p1-p7, in which the listed references were cited.

* cited by examiner

*Primary Examiner* — Dawayne A Pinkney
(74) *Attorney, Agent, or Firm* — Jianq Chyun IP Office

(57) ABSTRACT

An eyepiece lens consists essentially of a first lens having positive refractive power, a second lens having negative refractive power, a third lens having positive refractive power, and a fourth lens having positive refractive power in this order from an observation object side. Conditional expression (1): −3.5<f/fA<0.0 is satisfied, where
  f: a focal length of an entire system, and
  fA: a combined focal length of the first lens and the second lens.

9 Claims, 4 Drawing Sheets

EXAMPLE 1

EXAMPLE 2

FIG.3 EXAMPLE 3
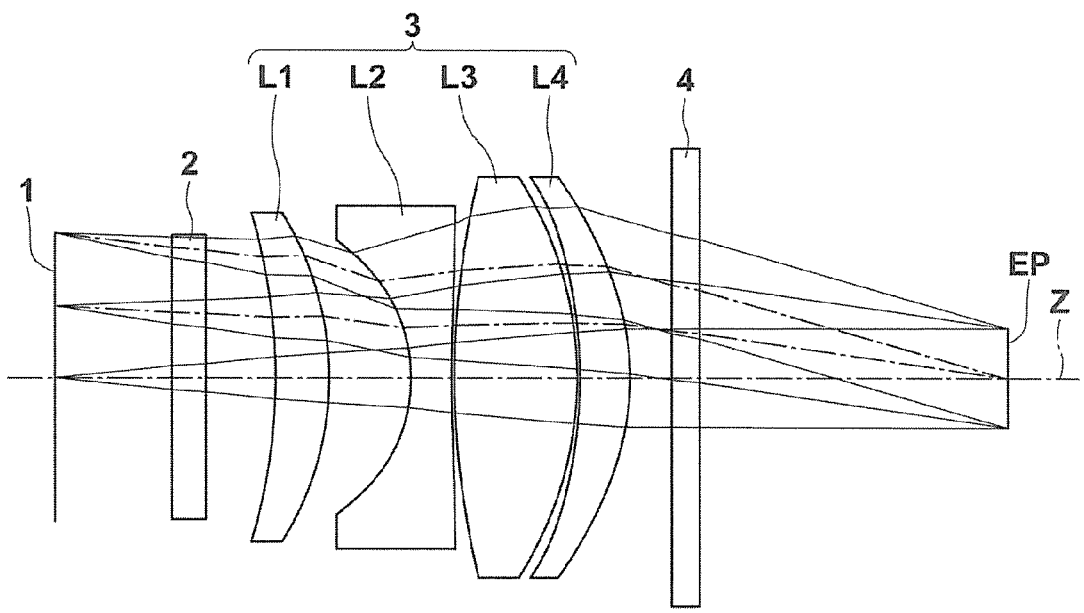
FIG.4 EXAMPLE 1
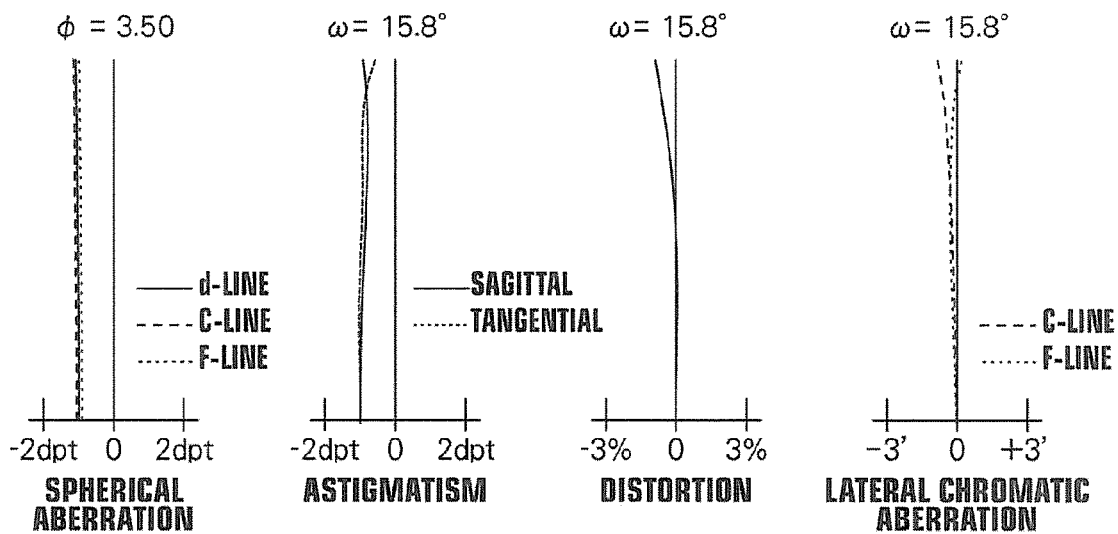

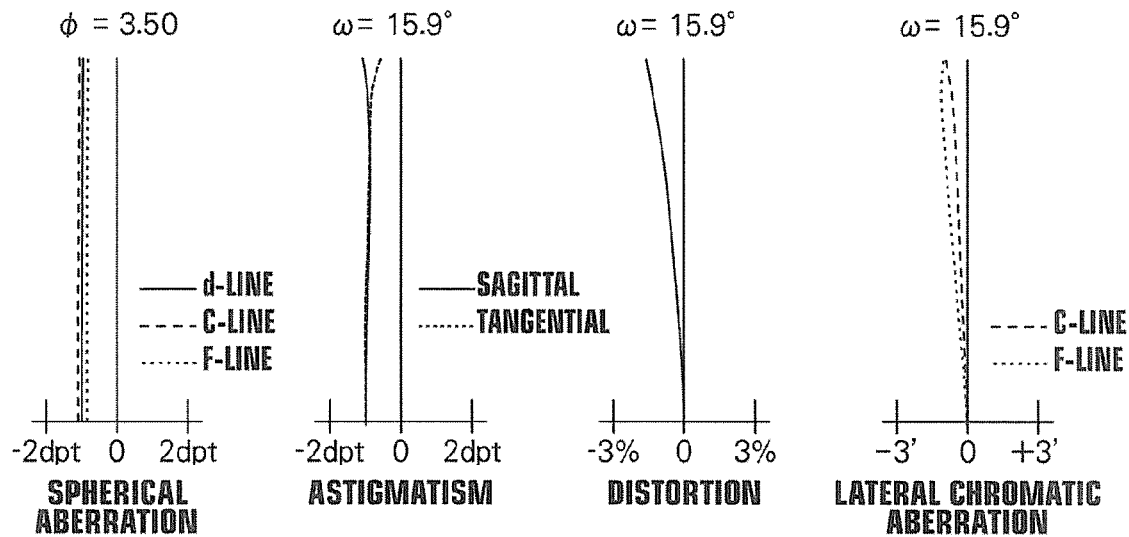
FIG.5 EXAMPLE 2
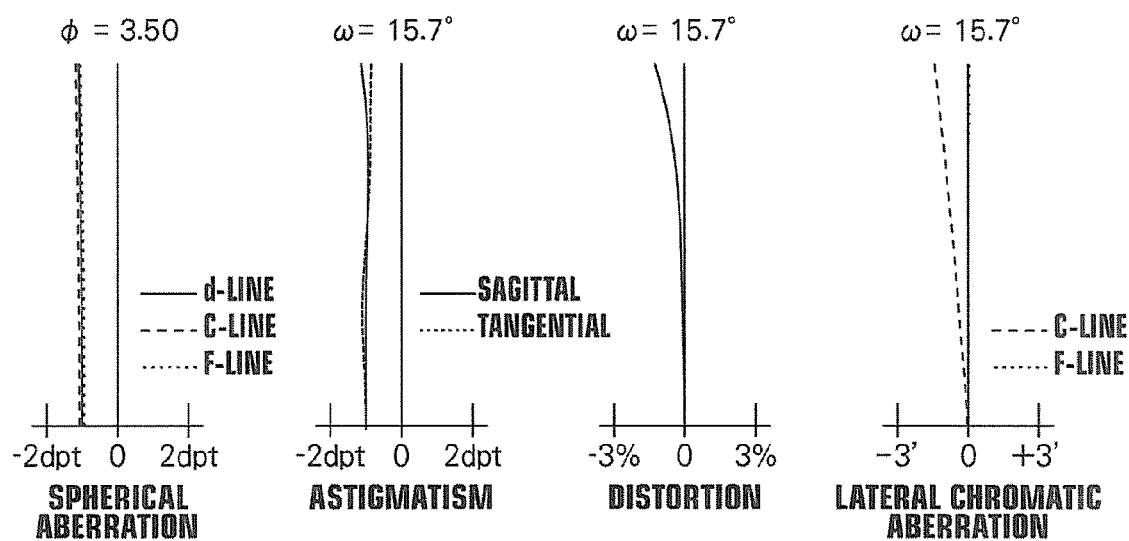
FIG.6 EXAMPLE 3

EYEPIECE LENS AND IMAGING APPARATUS

CROSS-REFERENCE TO RELATED APPLICATIONS

The present application claims priority under 35 U.S.C. §119 to Japanese Patent Application No. 2014-120240, filed on Jun. 11, 2014. The above application is hereby expressly incorporated by reference, in its entirety, into the present application.

BACKGROUND OF THE INVENTION

Field of the Invention

The present invention relates to an eyepiece lens and an imaging apparatus. In particular, the present invention relates to an eyepiece lens appropriate for magnified observation of an image displayed on an image display surface and an imaging apparatus on which this eyepiece lens has been mounted.

Description of the Related Art

Conventionally, eyepiece lenses for magnifying images displayed on image display surfaces of liquid crystal display devices or the like to observe the magnified images by the naked eye were used in viewfinders of digital cameras, video cameras and the like. For example, a 3-element eyepiece lens in which a positive lens, a negative lens and a positive lens are arranged in this order from an observation object side, as disclosed in Japanese Unexamined Patent Publication No. 2006-106491 (Patent Document 1), has been proposed. Further, Japanese Unexamined Patent Publication No. 2002-048985 (Patent Document 2) and Japanese Unexamined Patent Publication No. 2007-264179 (Patent Document 3) propose 4-element eyepiece lenses.

SUMMARY OF THE INVENTION

The size of an eyepiece lens for a viewfinder of a digital camera or the like needs to be small. As the resolution of liquid crystal display devices became higher recently, the eyepiece lenses need to have high image formation performance while the size of the eyepiece lenses is small. Further, eyepiece lenses that can perform observation at high magnification ratios are needed to cope with an image display surface in small size and to satisfy a demand for obtaining a large observation image. However, it is difficult to secure the telecentricity toward the observation object side when an eyepiece lens has a high magnification ratio. When a liquid crystal display device or the like, which has directivity, is an observation object, if the telecentricity toward the observation object side is low, extinction of light and a fluctuation of the tone of color occur. Therefore, there is a problem that it is difficult to obtain excellent observation images.

When the magnification of the eyepiece lens, as disclosed in Patent Document 1, is tried to be increased while excellent optical performance is maintained, that is difficult if the eyepiece lens consists of three lenses. Patent Documents 2 and 3 disclose 4-element eyepiece lenses. However, more excellent correction of aberrations is requested to cope with higher resolution of recent years.

In view of the foregoing circumstances, it is an object of the present invention to provide an eyepiece lens configured in small size, and the telecentricity of which toward an observation object side is secured while observation at a high magnification ratio is possible, and in which various aberrations are excellently corrected to have excellent optical performance, and also an imaging apparatus including this eyepiece lens.

An eyepiece lens of the present invention consists essentially of a first lens having positive refractive power, a second lens having negative refractive power, a third lens having positive refractive power, and a fourth lens having positive refractive power in this order from an observation object side. The following conditional expression (1) is satisfied:

$$-3.5 < f/fA < 0.0 \qquad (1),\text{ where}$$

f: a focal length of an entire system, and
fA: a combined focal length of the first lens and the second lens.

In the eyepiece lens of the present invention, it is desirable that the following conditional expression (1-2) is satisfied. It is more desirable that the following conditional expression (1-3) is satisfied:

$$-2.0 < f/fA < 0.0 \qquad (1\text{-}2);$$

$$-1.5 < f/fA < -0.5 \qquad (1\text{-}3).$$

In the eyepiece lens of the present invention, it is desirable that the following conditional expression (2) is satisfied when a combined focal length of the third lens and the fourth lens is fB. It is more desirable that the following conditional expression (2-2) is satisfied:

$$1.0 < f/fB < 2.1 \qquad (2);\text{ and}$$

$$1.5 < f/fB < 2.0 \qquad (2\text{-}2).$$

In the eyepiece lens of the present invention, it is desirable that the following conditional expression (3) is satisfied when a focal length of the second lens is f2. It is more desirable that the following conditional expression (3-2) is satisfied:

$$-5.0 < f/f2 < -1.2 \qquad (3);\text{ and}$$

$$-2.5 < f/f2 < -1.5 \qquad (3\text{-}2).$$

In the eyepiece lens of the present invention, it is desirable that the following conditional expression (4) is satisfied when a paraxial curvature radius of an object-side surface of the second lens is R2f. It is more desirable that the following conditional expression (4-2) is satisfied:

$$-4.0 < f/R2f < -2.0 \qquad (4);\text{ and}$$

$$-3.5 < f/R2f < -2.5 \qquad (4\text{-}2).$$

An imaging apparatus of the present invention includes the aforementioned eyepiece lens of the present invention.

Here, the aforementioned term "essentially" means that lenses substantially without any refractive power, optical elements, such as a stop and a cover glass, other than lenses, a lens flange, a lens barrel and the like may be included in addition to the mentioned composition elements.

The sign of the refractive power of the aforementioned lenses and a focal length are considered in a paraxial region when the lens includes an aspheric surface. The sign of a paraxial curvature radius is positive when the surface shape is convex toward the object side, and negative when the surface shape is convex toward the eye point side.

According to the present invention, the number of positive lenses and the number of a negative lens and the arrangement of these lenses are appropriately set in a lens system consisting essentially of four lenses, and a predetermined conditional expression or expressions are satisfied. Therefore, it is possible to achieve an eyepiece lens configured in small size, and the telecentricity of which toward an observation object side is secured while observation at a high magnification ratio is possible, and in which various aberrations are excellently corrected to have excellent optical performance, and also an imaging apparatus including this eyepiece lens.

BRIEF DESCRIPTION OF THE DRAWINGS

FIG. 3 is a cross section illustrating the configuration of an eyepiece lens in Example 3 of the present invention and optical paths;

FIG. 4 is aberration diagrams of the eyepiece lens in Example 1 of the present invention, and a diagram of a spherical aberration, a diagram of astigmatism, a diagram of distortion and a diagram of a lateral chromatic aberration are illustrated from the left side of the paper;

FIG. 5 is aberration diagrams of the eyepiece lens in Example 2 of the present invention, and a diagram of a spherical aberration, a diagram of astigmatism, a diagram of distortion and a diagram of a lateral chromatic aberration are illustrated from the left side of the paper;

FIG. 6 is aberration diagrams of the eyepiece lens in Example 3 of the present invention, and a diagram of a spherical aberration, a diagram of astigmatism, a diagram of distortion and a diagram of a lateral chromatic aberration are illustrated from the left side of the paper;

DESCRIPTION OF THE PREFERRED EMBODIMENTS

Hereinafter, embodiments of the present invention will be described in detail with reference to drawings.

Figure 1:
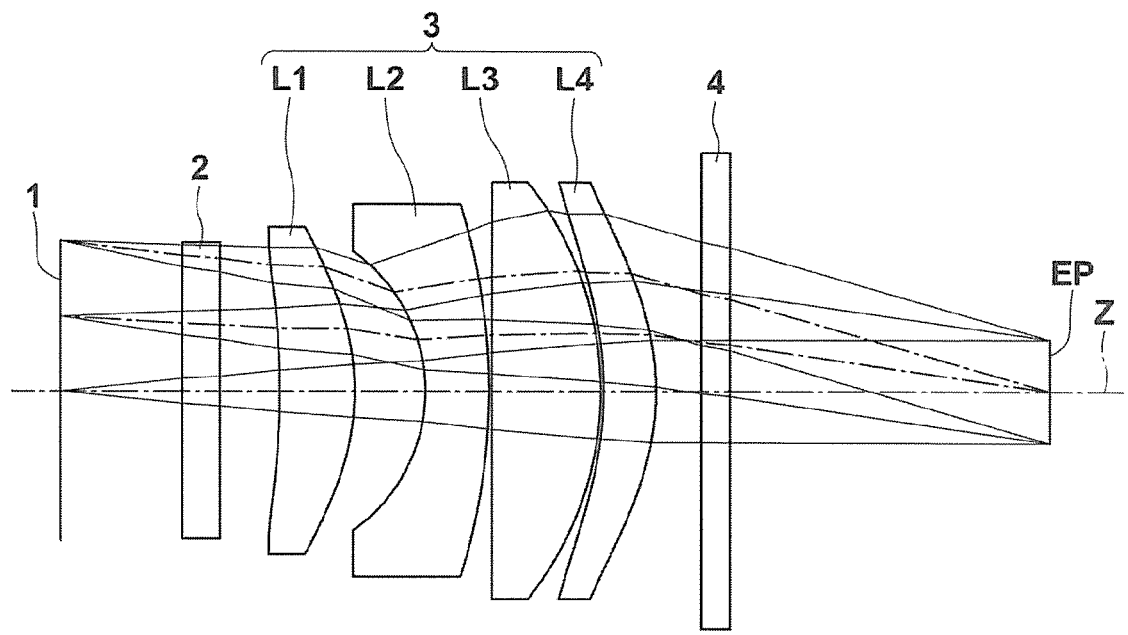
FIG. 1 is a cross section illustrating the configuration of an eyepiece lens in Example 1 of the present invention and optical paths.
Figure 2:
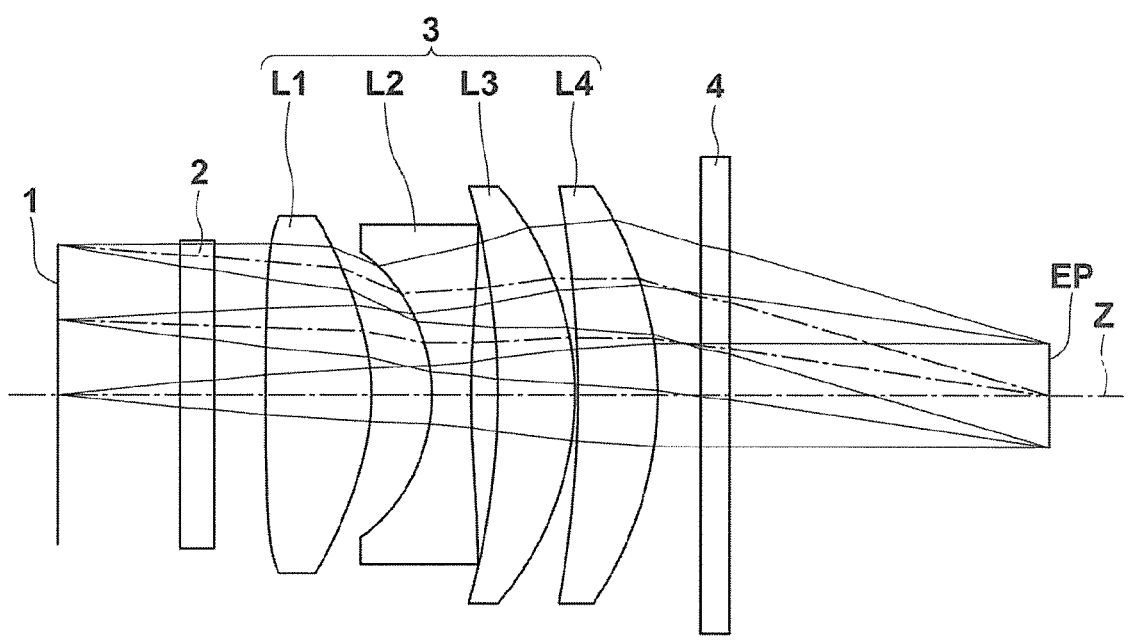
FIG. 2 is a cross section illustrating the configuration of an eyepiece lens in Example 2 of the present invention and optical paths.

FIG. 1 is a cross section illustrating the configuration of an eyepiece lens according to an embodiment of the present invention. The example of configuration illustrated in FIG. 1 corresponds to an eyepiece lens in Example 1, which will be described later. Similarly, FIG. 2 and FIG. 3 are cross sections illustrating examples of configuration corresponding to eyepiece lenses in Example 2 and Example 3, which will be described later. In FIG. 1 through FIG. 3, the same illustration method is used, and basic configurations are the same. Therefore, the embodiments of the present invention will be described mainly with reference to FIG. 1.

In FIG. 1, an image display surface 1 is an observation object. A ray traveling from each point on the image display surface 1 to eye point EP is also illustrated. Eye point EP illustrated in FIG. 1 does not represent the size nor the shape of the eye point, but the position of the eye point in the direction of the optical axis. In FIG. 1, the left side is the observation object side, and the right side is the eye point side. In the following descriptions, the observation object side will be referred to as the object side.

This eyepiece lens 3 is used when an image displayed on an image display surface 1 of a display device is observed by being magnified. The display device is, for example, a liquid crystal display device and the like. FIG. 1 illustrates an example in which parallel-flat-plate-shaped optical members 2 and 4 are arranged between the image display surface 1 and the eyepiece lens 3 and between the eyepiece lens 3 and eye point EP, respectively. The optical members 2 and 4 are assumed to be a cover glass for protection, various filters and the like. The eyepiece lens of the present invention is configurable without these members.

This eyepiece lens 3 consists essentially of first lens L1 having positive refractive power, second lens L2 having negative refractive power, third lens L3 having positive refractive power, and fourth lens L4 having positive refractive power arranged in this order, along optical axis Z, from the object side toward the eye point side. Since the eyepiece lens 3 has such configuration consisting of four lenses, it is possible to achieve the eyepiece lens having a high magnification ratio while various aberrations are excellently corrected.

The eyepiece lens 3 is configured to satisfy the following conditional expression (1):

$$-3.5 < f/fA < 0.0 \qquad (1),$$ where f: a focal length of an entire system, and fA: a combined focal length of first lens L1 and second lens L2.

Conditional expression (1) regulates the ratio of the focal length of the entire system to the combined focal length of first lens L1 and second lens L2. In other words, conditional expression (1) regulates the ratio of the combined refractive power of first lens L1 and second lens L2 to the refractive power of the entire system. When conditional expression (1) is satisfied, the combined optical system of first lens L1 and second lens L2, as a whole, has negative refractive power. When the eyepiece lens 3 is configured in such a manner that the value is not higher than or equal to the upper limit of conditional expression (1), it is possible to appropriately obtain the effect of aberration correction by first lens L1 and second lens L2, and to easily correct curvature of field. When the eyepiece lens 3 is configured in such a manner that the value is not less than or equal to the lower limit of conditional expression (1), it is possible to prevent the combined refractive power of first lens L1 and second lens L2 from becoming too strong, and to easily secure the telecentricity toward the object side while maintaining high magnification.

It is more desirable that the following conditional expression (1-2) is satisfied to further enhance the effect about conditional expression (1). It is more desirable that the following conditional expression (1-3) is satisfied to enhance the effect even more:

$$-2.0 < f/fA < 0.0 \qquad (1\text{-}2); \text{ and}$$

$$-1.5 < f/fA < -0.5 \qquad (1\text{-}3).$$

It is desirable that this eyepiece lens 3 satisfies the following conditional expression (2):

$$1.0 < f/fB < 2.1 \qquad (2),$$ where fB: a combined focal length of third lens L3 and fourth lens L4.

Conditional expression (2) regulates the ratio of the focal length of the entire system to the combined focal length of third lens L3 and fourth lens L4. In other words, conditional expression (2) regulates the ratio of the combined refractive power of third lens L3 and fourth lens L4 to the refractive power of the entire system. When the eyepiece lens 3 is configured in such a manner that the value is not higher than or equal to the upper limit of conditional expression (2), it is possible to suppress pincushion distortion while excellently correcting a spherical aberration. When the eyepiece lens 3 is configured in such a manner that the value is not less than or equal to the lower limit of conditional expression (2), it is possible to easily suppress barrel distortion while excellently correcting a spherical aberration.

It is more desirable that the following conditional expression (2-2) is satisfied to further enhance the effect about conditional expression (2):

$$1.5 < f/fB < 2.0 \qquad (2\text{-}2).$$

It is desirable that this eyepiece lens 3 satisfies the following conditional expression (3):

$$-5.0<f/f2<-1.2 \quad (3),$$ where f: a focal length of an entire system, and
f2: a focal length of second lens L2.

Conditional expression (3) regulates the ratio of the focal length of the entire system to the focal length of second lens L2. In other words, conditional expression (3) regulates the ratio of the refractive power of second lens L2 to the refractive power of the entire system. When the eyepiece lens 3 is configured in such a manner that the value is not higher than or equal to the upper limit of conditional expression (3), it is possible to prevent the refractive power of second lens L2 from becoming insufficient, and to easily correct chromatic aberrations. When the eyepiece lens 3 is configured in such a manner that the value is not less than or equal to the lower limit of conditional expression (3), it is possible to prevent the refractive power of second lens L2 from becoming too strong, and to easily suppress chromatic aberrations.

It is more desirable that the following conditional expression (3-2) is satisfied to further enhance the effect about conditional expression (3):

$$-2.5<f/f2<-1.5 \quad (3\text{-}2).$$

It is desirable that this eyepiece lens 3 satisfies the following conditional expression (4):

$$-4.0<f/R2f<-2.0 \quad (4),$$ where f: a focal length of an entire system, and
R2f: a paraxial curvature radius of an object-side surface of second lens L2.

Conditional expression (4) regulates the ratio of the focal length of the entire system to the paraxial curvature radius of the object-side surface of second lens L2. When the eyepiece lens 3 is configured in such a manner that the value is not higher than or equal to the upper limit of conditional expression (4), it is possible to appropriately obtain the effect of aberration correction by the object-side surface of second lens L2. Especially, it is possible to easily correct astigmatism in an excellent manner. When the eyepiece lens 3 is configured in such a manner that the value is not less than or equal to the lower limit of conditional expression (4), it is possible to prevent the absolute value of the paraxial curvature radius of the object-side surface of second lens L2 from becoming too small, and to easily suppress excessive correction of astigmatism.

It is more desirable that the following conditional expression (4-2) is satisfied to further enhance the effect about conditional expression (4):

$$-3.5<f/R2f<-2.5 \quad (4\text{-}2).$$

For example, as illustrated in FIG. 1, the eyepiece lens 3 may consist of first lens L1 that is a positive meniscus lens with its convex surface facing the eye point side, second lens L2 that is a negative meniscus lens with its convex surface facing the eye point side, third lens L3 that is a plano-convex lens with its flat surface facing the object side, and fourth lens L4 that is a positive meniscus lens with its convex surface facing the eye point side. Alternatively, as illustrated in FIG. 2, the eyepiece lens 3 may consist of first lens L1 that is a biconvex lens, second lens L2 that is a biconcave lens, third lens L3 that is a positive meniscus lens with its convex surface facing the eye point side, and fourth lens L4 that is a positive meniscus lens with its convex surface facing the eye point side. Alternatively, as illustrated in FIG. 3, the eyepiece lens 3 may consist of first lens L1 that is a positive meniscus lens with its convex surface facing the eye point side, second lens L2 that is a biconcave lens, third lens L3 that is a biconvex lens, and fourth lens L4 that is a positive meniscus lens with its convex surface facing the eye point side.

All of the four lenses constituting the eyepiece lens 3 may be single lenses that are not cemented together. In such a case, the flexibility of design is higher, compared with a case in which a cemented lens is included, and it is possible to easily obtain more excellent image formation performance. Especially, it is desirable that first lens L1 and second lens L2 are arranged with an air space therebetween. In such a case, the configuration is advantageous to correction of curvature of field.

The eyepiece lens 3 may include an aspheric lens or lenses. Use of an aspheric lens or lenses is advantageous to securement of the telecentricity and achievement of excellent image formation performance. For example, the example of the eyepiece lens 3 illustrated in FIG. 1 uses two aspheric lenses. At least one of the lens closest to the object side and the lens closest to the eye point side may be an aspheric lens. When the lens closest to the object side is an aspheric lens, it is possible to easily correct high-order astigmatism in an excellent manner. When the lens closest to the eye point side is an aspheric lens, it is possible to easily correct a high-order spherical aberration in an excellent manner.

The aforementioned desirable configuration and adoptable configuration may be arbitrarily combined. It is desirable that the configuration is optionally adopted in an appropriate manner based on required specification.

Next, numerical value examples of the eyepiece lens of the present invention will be described.

EXAMPLE 1

FIG. 1 is a diagram illustrating the lens configuration of an eyepiece lens in Example 1. Table 1 and Table 2 show basic lens data and specification of the eyepiece lens in Example 1 and aspherical coefficients of the eyepiece lens in Example 1, respectively. In Table 1, a column of Si shows an i-th (i=0, 1, 2, 3, . . . ) surface number when the surface of the image display surface 1 is the 0-th surface and the surface numbers are assigned to sequentially increase toward the eye point side. A column of Ri shows the curvature radius of the i-th surface. A column of Di shows a surface distance, on optical axis Z, between the i-th surface and the (i+1)th surface. A column of Ndj shows the refractive index for d-line (wavelength is 587.6 nm) of a j-th (j=1, 2, 3, . . . ) optical element from the object side. A column of vdj shows the Abbe number for d-line of the j-th optical element from the object side.

Here, the basic lens data show data including optical members 2 and 4. In the column of Si, the term "(OBJ)" and the term "(EP)" are written together surface numbers in the row of a surface corresponding to the image display surface 1 and the row of a surface corresponding to eye point EP, respectively. The sign of a curvature radius is positive when a surface shape is convex toward the object side, and negative when a surface shape is convex toward the eye point side.

A section under the box of Table 1 shows values of focal length f of the entire system, a diopter and an apparent field of view, as specification of the eye piece lens in Example 1. In Table 1, mm is used as the unit of length, diopter is used as the unit of a diopter value, and degree is used as the unit of an apparent field of view. The specification in Table 1 is values for d-line.

In the basic lens of Table 1, marks * are attached to the surface numbers of aspheric surfaces, and the column of curvature radius shows numerical values of paraxial curvature radii. Table 2 shows aspherical coefficients of these aspheric surfaces. In the numerical values of the aspherical coefficients in Table 2, "E−n" (n: integer) means "×10⁻ⁿ". The aspherical coefficients are values of coefficients KA and Am (m=4, 6, 8 and 10) in the following aspheric surface equation:

$$Zd = \frac{C \times h^2}{1 + \sqrt{1 - KA \times C^2 \times h^2}} + \sum_m Am \times h^m,$$

[Equation 1]

where
Zd: the depth of an aspheric surface (the length of a perpendicular from a point on the aspheric surface at height h to a flat surface that is in contact with the vertex of the aspheric surface and perpendicular to the optical axis,
h: height (a length from the optical axis to the lens surface),
C: a paraxial curvature, and
KA and Am: aspherical coefficients (m=4, 6, 8 and 10).

TABLE 1

| EXAMPLE 1 | | | | |
|---|---|---|---|---|
| Si | Ri | Di | Ndj | vdj |
| 0 (OBJ) | ∞ | 4.19 | | |
| 1 | ∞ | 1.3000 | 1.51680 | 64.20 |
| 2 | ∞ | 2.0468 | | |
| *3 | −25.6675 | 2.5700 | 1.53389 | 55.98 |
| *4 | −8.2457 | 2.4265 | | |
| 5 | −5.6743 | 2.1800 | 1.80809 | 22.76 |
| 6 | −20.3567 | 0.1006 | | |
| 7 | ∞ | 3.7400 | 1.80400 | 46.58 |
| 8 | −10.9768 | 0.1000 | | |
| *9 | −12.2349 | 1.8000 | 1.53389 | 55.98 |
| *10 | −8.9793 | 1.5511 | | |
| 11 | ∞ | 1.0000 | 1.51680 | 64.20 |
| 12 | ∞ | 11.0000 | | |
| 13 (EP) | ∞ | | | |
| f | | | 17.80 | |
| DIOPTER | | | −1.01 | |
| APPARENT FIELD OF VIEW | | | 31.51 | |

TABLE 2

| EXAMPLE 1 | | | | |
|---|---|---|---|---|
| SURFACE NUMBER | 3 | 4 | 9 | 10 |
| KA | 1.0000000E+00 | 1.0000000E+00 | 1.0000000E+00 | 1.0000000E+00 |
| A4 | 2.7873093E−04 | 4.2861299E−04 | 1.6013906E−04 | 2.4758224E−04 |
| A6 | −4.5377734E−05 | −3.1974298E−05 | 1.2486656E−06 | 1.7338243E−06 |
| A8 | 2.6509064E−06 | 2.0906020E−06 | 7.8031746E−08 | 8.8390205E−08 |
| A10 | −3.9901547E−08 | −3.4250517E−08 | −1.1821549E−09 | −7.7934814E−10 |

FIG. 4 illustrates a diagram of a spherical aberration, a diagram of astigmatism, a diagram of distortion, and a diagram of a lateral chromatic aberration of the eyepiece lens in Example 1 in this order from the left side of the paper. In the diagram of a spherical aberration, aberrations for d-line (wavelength is 587.6 nm), C-line (wavelength is 656.3 nm) and F-line (wavelength is 486.1 nm) are illustrated by a solid line, a long broken line, and a short broken line, respectively. In the diagram of astigmatism, aberrations for d-line in a sagittal direction and a tangential direction are illustrated by a solid line and a short broken line, respectively. In the diagram of distortion, an aberration for d-line is illustrated by a solid line. In the diagram of a lateral chromatic aberration, aberrations for C-line and F-line are illustrated by a long broken line and a short broken line, respectively. In the diagram of a spherical aberration and the diagram of astigmatism, the unit of the horizontal axis is diopter. In the diagram of distortion, the unit of the horizontal axis is %. In the diagram of a lateral chromatic aberration, the unit of the horizontal axis is minute. In the diagram of a spherical aberration, ϕ means the diameter of an eye point when the unit is mm. In the other aberration diagrams, ω means a half angle of an apparent field of view.

The signs, meanings and description methods of various kinds of data about Example 1 are similar also in the following examples, unless otherwise mentioned. Therefore, redundant explanation will be omitted.

EXAMPLE 2

FIG. 2 is a diagram illustrating the lens configuration of an eyepiece lens in Example 2. Table 3 and Table 4 show basic lens data and specification of the eyepiece lens in Example 2 and aspherical coefficients of the eyepiece lens in Example 2, respectively. FIG. 5 illustrates a diagram of a spherical aberration, a diagram of astigmatism, a diagram of distortion, and a diagram of a lateral chromatic aberration of the eyepiece lens in Example 2 in this order from the left side of the paper.

TABLE 3

| EXAMPLE 2 | | | | |
|---|---|---|---|---|
| Si | Ri | Di | Ndj | vdj |
| 0 (OBJ) | ∞ | 4.19 | | |
| 1 | ∞ | 1.2000 | 1.51680 | 64.20 |
| 2 | ∞ | 1.7500 | | |
| *3 | 87.3155 | 3.6243 | 1.53389 | 55.98 |
| *4 | −8.0416 | 2.0768 | | |
| *5 | −5.9154 | 1.3569 | 1.63351 | 23.63 |
| *6 | 31.1960 | 0.9014 | | |
| 7 | −25.4245 | 2.6529 | 1.80400 | 46.58 |
| 8 | −10.6179 | 0.1000 | | |
| 9 | −38.2913 | 2.7480 | 1.83481 | 42.73 |
| 10 | −12.2297 | 1.4883 | | |
| 11 | ∞ | 1.0000 | 1.51680 | 64.20 |

TABLE 3-continued

| EXAMPLE 2 | | | | |
|---|---|---|---|---|
| 12 | ∞ | 11.0000 | | |
| 13(EP) | ∞ | | | |
| f | | | 17.52 | |
| DIOPTER | | | −1.01 | |
| APPARENT FIELD OF VIEW | | | 31.70 | |

TABLE 4

EXAMPLE 2

| SURFACE NUMBER | 3 | 4 | 5 | 6 |
|---|---|---|---|---|
| KA | 1.0000000E+00 | 1.0000000E+00 | 1.0000000E+00 | 1.0000000E+00 |
| A4 | −3.3491403E−04 | 4.7681939E−04 | 2.8817659E−04 | −3.1080604E−04 |
| A6 | 2.4819583E−05 | 1.6832141E−05 | −3.5332394E−07 | −1.9660410E−06 |
| A8 | −6.4214025E−07 | −5.9040830E−07 | −8.8367233E−07 | 1.4256614E−07 |
| A10 | 1.0088799E−08 | 5.9078728E−09 | 1.8941621E−08 | −1.4248960E−09 |

EXAMPLE 3

FIG. 3 is a diagram illustrating the lens configuration of an eyepiece lens in Example 3. Table 5 and Table 6 show basic lens data and specification of the eyepiece lens in Example 3 and aspherical coefficients of the eyepiece lens in Example 3, respectively. FIG. 6 illustrates a diagram of a spherical aberration, a diagram of astigmatism, a diagram of distortion, and a diagram of a lateral chromatic aberration of the eyepiece lens in Example 3 in this order from the left side of the paper.

TABLE 5

EXAMPLE 3

| Si | Ri | Di | Ndj | vdj |
|---|---|---|---|---|
| 0 (OBJ) | ∞ | 4.19 | | |
| 1 | ∞ | 1.2000 | 1.51680 | 64.20 |
| 2 | ∞ | 2.5000 | | |
| 3 | −19.5314 | 1.9031 | 1.85026 | 32.27 |
| 4 | −10.6974 | 2.9112 | | |
| *5 | −5.9196 | 1.4502 | 1.63351 | 23.63 |
| *6 | 50.5339 | 0.1000 | | |
| 7 | 29.1727 | 4.3873 | 1.83481 | 42.73 |
| 8 | −12.7774 | 0.1000 | | |
| *9 | −16.1858 | 1.8000 | 1.53389 | 55.98 |
| *10 | −9.0924 | 1.4885 | | |
| 11 | ∞ | 1.0000 | 1.51680 | 64.20 |
| 12 | ∞ | 11.0000 | | |
| 13 (EP) | ∞ | | | |

| | |
|---|---|
| f | 17.77 |
| DIOPTER | −1.02 |
| APPARENT FIELD OF VIEW | 31.46 |

TABLE 6

EXAMPLE 3

| SURFACE NUMBER | 5 | 6 | 9 | 10 |
|---|---|---|---|---|
| KA | 1.0000000E+00 | 1.0000000E+00 | 1.0000000E+00 | 1.0000000E+00 |
| A4 | −7.9724763E−04 | −3.8318206E−04 | 1.3771696E−04 | 2.4070790E−04 |
| A6 | 1.7596716E−05 | 9.3858121E−06 | −4.8015866E−06 | 2.6951344E−07 |
| A8 | −7.7786105E−07 | −1.4975246E−07 | 1.5493942E−08 | 2.0487119E−08 |
| A10 | 3.6408688E−08 | 1.3648071E−09 | −1.1586252E−10 | −9.4610163E−11 |

Table 7 shows values corresponding to the aforementioned conditional expressions (1) through (4) in Examples 1 through 3. Table 7 shows data for d-line.

TABLE 7

| | (1) f/fA | (2) f/fB | (3) f/f2 | (4) f/R2f |
|---|---|---|---|---|
| EXAMPLE 1 | −0.79 | 1.55 | −1.71 | −3.14 |
| EXAMPLE 2 | −0.62 | 1.64 | −2.26 | −2.96 |
| EXAMPLE 3 | −1.28 | 1.94 | −2.15 | −3.00 |

As these data show, the eyepiece lenses in Examples 1 through 3 have apparent fields of view of about 31°, which are sufficiently wide. Each of the eyepiece lenses consists four lenses, which are a small number of lenses, and is configured in small size. The telecentricity toward the object side is secured while the eyepiece lens is configured in such a manner that the focal length of the entire system is about 17 mm and observation at a high magnification ratio is possible. Various aberrations of the eyepiece lens are excellently corrected, and the eyepiece lens has high optical performance.

Figure 7:
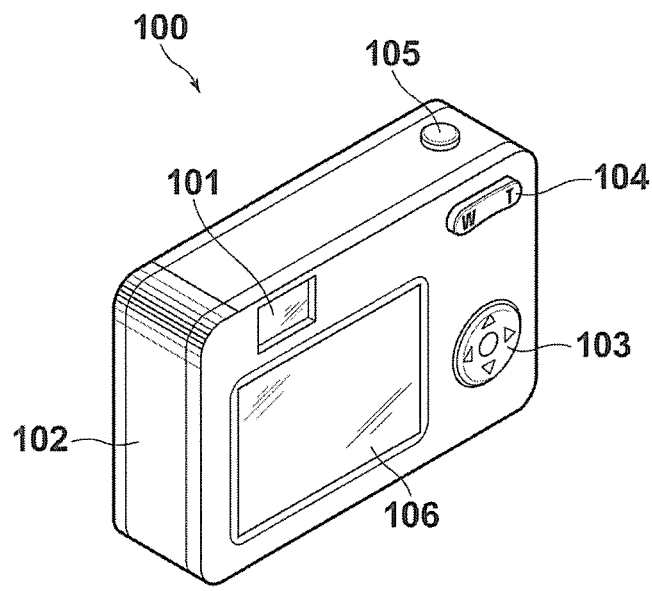
FIG. 7 is a schematic perspective view illustrating the configuration of the back side of an imaging apparatus according to an embodiment of the present invention.

Next, an embodiment of an imaging apparatus of the present invention will be described. FIG. 7 is a schematic perspective view illustrating the configuration on the back side of a camera 100 according to an embodiment of the imaging apparatus of the present invention. The camera 100 includes a finder 101 on an upper part of the camera body 102. The finder 101 includes an eyepiece lens according to an embodiment of the present invention. Further, the camera 100 includes an operation button 103 for performing various kinds of setting, a zoom lever 104 for changing magnification, and a monitor 106 for displaying an image and various setting screens on the back side of the camera body 102. The camera 100 includes a shutter button 105 on the upper surface of the camera body 102. In the camera 100, an image of a subject is formed on an imaging surface of an imaging device (not illustrated) by an imaging lens (not illustrated) arranged on the front side of the camera body 102. A user observes a finder image of the subject by looking through the finder 101 from the back side of the camera 100.

Figure 8:
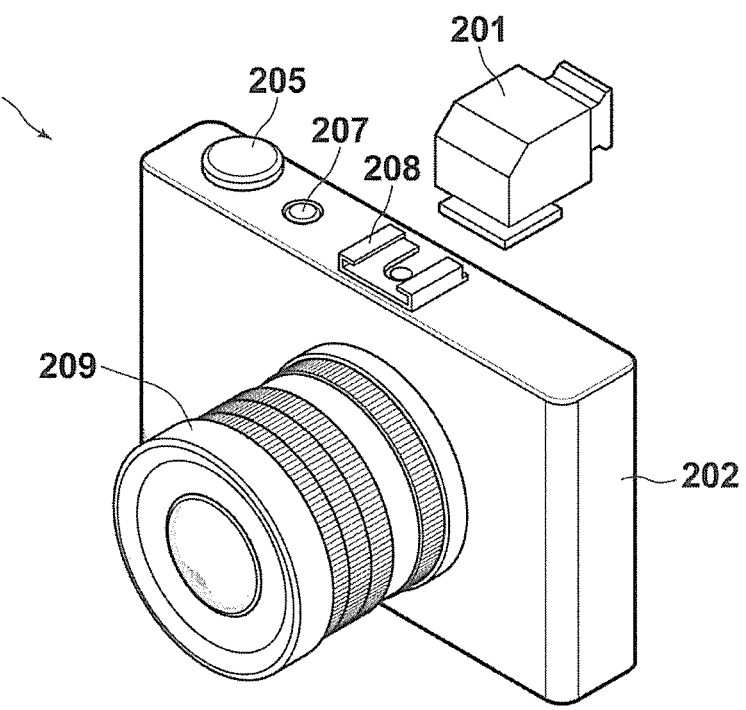
FIG. 8 is a schematic perspective view illustrating the configuration of a front side of an imaging apparatus according to another embodiment of the present invention.

FIG. 8 is a schematic perspective view illustrating the configuration on the front side of a camera 200 according to another embodiment of the imaging apparatus of the present invention. A finder is not built in the camera 200, and the camera 200 includes a finder according to an embodiment of the present invention, as an external finder 201. The external finder 201 includes an eyepiece lens according to an embodiment of the present invention. The camera 200 includes a shutter button 205, a power button 207 and a hot shoe 208 on the upper surface of a camera body 202. An imaging lens 209 has been mounted on a central part of the front side of the camera body 202. The external finder 201 is detachably mounted on the hot shoe 208. In the camera 200, an image of a subject is formed on an imaging surface of an imaging device (not illustrated) by the imaging lens 209. A user observes a finder image of the subject by looking through the finder 201 from the back side of the camera 200.

So far, the present invention has been described by using embodiments and examples. However, the present invention is not limited to the aforementioned embodiments nor examples, and various modifications are possible. For example, the values of a curvature radius, a distance between surfaces, a refractive index, an Abbe number, aspherical coefficients and the like of each lens are not limited to the values in the aforementioned numerical value examples, and may be other values.

What is claimed is:

1. An eyepiece lens consisting of:
   a first lens having positive refractive power;
   a second lens having negative refractive power;
   a third lens having positive refractive power; and
   a fourth lens having positive refractive power in this order from an observation object side, and the fourth lens is a meniscus lens with a convex surface facing an eye point side,
   wherein the following conditional expression (1) is satisfied:

$-3.5 < f/fA < 0.0$ (1), where f: a focal length of an entire system, and
   fA: a combined focal length of the first lens and the second lens,
   wherein the following conditional expression (4) is satisfied:

$-4.0 < f/R2f < -2.0$ (4), where

R2f: a paraxial curvature radius of an object-side surface of the second lens.

2. The eyepiece lens, as defined in claim 1, wherein the following conditional expression (2) is satisfied:

$1.0 < f/fB < 2.1$ (2), where fB: a combined focal length of the third lens and the fourth lens.

3. The eyepiece lens, as defined in claim 1, wherein the following conditional expression (3) is satisfied:

$-5.0 < f/f2 < -1.2$ (3), where f2: a focal length of the second lens.

4. The eyepiece lens, as defined in claim 1, wherein the following conditional expression (1-2) is satisfied:

$-2.0 < f/fA < 0.0$ (1-2).

5. The eyepiece lens, as defined in claim 1, wherein the following conditional expression (1-3) is satisfied:

$-1.5 < f/fA < -0.5$ (1-3).

6. The eyepiece lens, as defined in claim 2, wherein the following conditional expression (2-2) is satisfied:

$1.5 < f/fB < 2.0$ (2-2).

7. The eyepiece lens, as defined in claim 3, wherein the following conditional expression (3-2) is satisfied:

$-2.5 < f/f2 < -1.5$ (3-2).

8. The eyepiece lens, as defined in claim 1, wherein the following conditional expression (4-2) is satisfied:

$-3.5 < f/R2f < -2.5$ (4-2).

9. An imaging apparatus comprising:
   the eyepiece lens, as defined in claim 1.

* * * * *